Patented Nov. 19, 1940

2,222,188

UNITED STATES PATENT OFFICE 2,222,188

MANUFACTURE OF REFRACTORY ARTICLES

Harold E. White, Zelienople, Pa., assignor to Lava Crucible Company of Pittsburgh, Pittsburgh, Pa., a corporation of Pennsylvania No Drawing. Application August 8, 1938,
Serial No. 223,697

17 Claims. (Cl. 106—9)

This invention relates to refractory articles, such as crucibles, melting pots, and the like, made from graphite and similar refractory materials such, for example, as silicon carbide or mixtures of graphite and silicon carbide, and particularly to those containing residual carbon bond, and it is among its objects to provide improved working qualities in the batches used for making such articles, to provide improved properties in the finished articles, to supply the bond to the batch in novel form, and, if desired, to supply temporary bond. Other objects will appear from the following description.

The invention is predicated upon my discovery that when certain types of ceramic materials are sub-divided below a critical maximum particle size and mixed with partially volatile resinous binders, highly stable emulsions are formed upon agitation of the mixture with water or other liquid in which the ceramic material is not soluble, and that such emulsions possess great utility in the manufacture of articles of the type to which reference has been made.

The ceramic materials used in the practice of the invention are those of a slippery or unctuous nature, examples which will identify the class to ceramists being pyrophyllite, talc, and halloysite. Graphite, while not strictly a ceramic material, possesses similar properties and may be used in the production of emulsions in accordance with the invention, for which reasons it may be considered as being a member of the class of ceramic materials. Various other ceramic materials, such as feldspar, may be mixed with the ceramic materials of the class just defined.

Emulsions containing these ceramic materials are of particular value in the manufacture of graphite articles because they render the forming operations easier. Also, ceramic materials such as talc and pyrophyllite are of benefit to the finished article because they act in some manner to form a protective glaze at the surface of the finished article, and if the continuity of the glaze be disturbed it is self-healing upon subsequent heating owing to the content of such ceramic material in the body of the article below the broken surface.

A critical factor in the practice of the invention is adequate sub-division of the ceramic material because without such sub-division the benefits of the invention are not attained. My tests thus far have shown it to be necessary for the ceramic material to have a particle size not exceeding about 20 microns, although for most purposes I prefer that the particle size be less than about 14 microns. In general a suitable range of particle size is from 10 to 20 microns.

Various carbonaceous materials may be used in the practice of the invention. For instance, there may be used natural materials such as asphalts, for instance, Gilsonite. Other materials of a generally similar nature may be used likewise, such as coal tar and pitches of various types, not only those resulting from the treatment of petroleum and by-product coke oven products, but also those exemplified by the animal and vegetable stearine pitches, an example being hard cotton stearine pitch. There may be used also synthetic resins of which a wide variety are commercially available and applicable in the practice of the invention. For example, I have found that various "Bakelite" resins, such as "Bakelite XR–5995," "Bakelite C," and "Bakelite BR–3355," sold by the Bakelite Corporation, of New York City; the "Vinyl" resins, such as "Vinylite AYAF," sold by Carbide and Carbon Chemicals Corporation, of New York City; the material sold as "Vinsol" by Hercules Powder Company, Wilmington, Delaware; "Amberol" resin sold by Resinous Products & Chemical Co., Philadelphia, Pa., and "Beckosol 1500" and "Beckamine BH–398" sold by Beck, Koller & Co., Inc., Detroit, Michigan, are suited to the practice of the invention. These exemplify the wide range of synthetic resin products which may be used, not only from the standpoint of chemical make-up, but also in physical character since they include resins soluble and insoluble in water.

All of these carbonaceous materials are natural or synthetic materials which when heated provide residual carbon which remains after volatilization of either a natural constituent, as in the case of asphalts and pitches, or a decomposition product, or, in some instances, of a solvent, and in general they are of an adhesive nature and viscous when heated. All of them are resins or exhibit resin characteristics, and all act as binders. All such materials are herein termed partially volatile resinous binders for brevity of reference and to distinguish them from dextrine, goulac and the like binders.

Where these binders are used as solids in the formation of emulsions in accordance with the invention they should be finely sub-divided, most suitably to a particle size corresponding to the limits stated for the ceramic material.

Mixes of the ceramic material and some of these partially volatile resinous binders, for instance pitches, asphalts, and water-insoluble resins facilitate working and satisfactorily provide residual carbon bond, but they do not have any substantial temporary binder effect, i. e., they do not provide sufficient green strength. Temporary bonding, to permit handling of the green crucibles or other article, can be attained by the use of water soluble resins, or solutions of the binders in organic solvents. For instance, "Beckosol 1500" and "Bakelite XR-5995" are water solutions or suspensions which I have found to be especially suited for supplying temporary bond. Such resin binders as "Vinsol 37-1113" and some natural resinous binders such as "Gilsonite" and pitches, which are not water soluble, can be used to provide temporary binder by dissolving them in a suitable organic solvent such as toluol, carbon tetrachloride, acetone, alcohol, or petroleum naphtha. Although satisfactorily stable emulsions of ceramic material and solid resinous binder are provided by the invention, these solutions are advantageous in that they assist in making and maintaining the emulsion.

Depending in part upon the content of fixed carbon, some of the resinous binders may be used in solution to supply both temporary bond and residual carbon bond, or the emulsion may contain both a solution of temporary binder and a solid resinous binder to supply residual carbon bond.

So profound is the emulsifying effect of subdividing the ceramic material and solid resin, where used, that large amounts of the mixture of ceramic material and resinous binder may be transformed into highly stable emulsions. For example, as much as equal parts of the solid mixture and water may be formed into an emulsion in which the solid matter is carried in suspension and does not show any material tendency to settle out over a prolonged period of standing in the quiescent state. The suspensions are formed easily by vigorous agitation of water with the mixture of ceramic material and resin binder, or of the ceramic material and a solution of resinous binder with or without addition of water, as the case may be.

The emulsion thus formed is then used to supply part, preferably all, of the bond of carbon bonded articles of the type referred to above. In ordinary practice the forming of crucibles and the like from batches containing graphite has been attended by difficulties in working and shaping the article, and the general practice has been to use expensive molds and presses, or special spinning machines, rather than the equipment ordinarily used in the manufacture of similar articles from, for example, clay compositions. The emulsions embodied in the present invention have the advantage that the shaping, or forming, of graphite batches is so improved or facilitated as to permit forming the articles with ordinary machines, thus rendering unnecessary hydraulic presses, special spinning machines, and the like that have heretofore been necessary. Reference has been made herinabove to the effect of such ceramic materials such as talc to provide a protective and healing glaze in the finished article, a feature of major importance to the user of such articles because of the increased life which results from this phenomena.

An important advantage of the invention is that the use of the resinous binders represents a substantial improvement over the binders ordinarily used, exemplified by dextrine and goulac. These commonly used binders exhibit a more or less pronounced tendency to bloat when the article is dried and fired. In contrast, the resins used to provide temporary bond in the practice of the present invention all appear to shrink in drying and firing, thus insuring greater density in the finished article. This results not only in improved strength, but also in reduced porosity with consequent reduction in rate of oxidation and in absorption of metal or other material handled in the crucible or other article.

The proportions in which the materials are used will vary depending upon such factors as the composition of the batch being formed, the properties requisite in the article, the amount of residual carbon bond necessary, and the particular partially volatile resinous binder which is used. Hence, numerical proportions cannot be set for all purposes and all materials falling within the scope of the invention. As an example, however, where the fixed carbon in the binder is about 75 per cent by weight, suitable results are had using a 50—50 ratio of ceramic material to binder. A mixture that has been found to be suitable for many purposes is made from coal tar pitch and "Bakelite XR-5995." Coal tar pitch is a cheap form of resinous binder of high fixed carbon content, to supply residual carbon bond, and it is readily emulsified with the ceramic material used in the practice of the invention. The grade of Bakelite named supplies temporary bond. It is sold as a clear solution in water said to contain about 60 per cent of solids, and this solution can be diluted with water to a content of about 19 per cent of solvents without precipitation. Upon greater dilution precipitation may occur but the precipitate can be redissolved by adding alcohol. At present it is preferred to use about 20 per cent of coal tar pitch having a fixed carbon content of 70 per cent, which should leave a residue of about 14 per cent of carbon upon firing. To this there is added about 7 per cent by weight of the solution of "Bakelite XR-5995." Such a material can be used satisfactorily, for instance, to supply the carbonaceous binding material referred to in my Patent No. 2,104,841, granted January 11, 1938.

The amount of emulsion used in making a ceramic batch is likewise variable and dependent upon various factors such as the composition of the emulsion and the grog materials used. In general, however, the emulsion may amount to from about 5 to about 50 per cent by weight of the batch. It will be understood also that although for the best results the ceramic material is sub-divided to, for instance, 10 to 20 micron particle size, it may contain some proportion of material of somewhat coarser particle size, say up to 50 or 75 microns, while yet obtaining the benefits of the invention. As much as 20 per cent of such coarser material might be tolerated without affecting the emulsion forming and emulsion stability, but of course the major proportion of the ceramic material should be finely divided as described above.

According to the provisions of the patent statutes, I have explained the principle of practicing my invention and have described what I now consider to reprsent its best embodiment. However, I desire to have it understood that, within the scope of the appended claims, the invention may be practiced otherwise than as specifically described.

I claim:

1. As a new article of manufacture, an emul- 1. sion adapted for use in making graphite and the like refractory articles containing residual carbon bond, comprising a stable emulsion of refractory ceramic material which does not swell in water and when dry is of slippery, unctuous nature at least the major proportion of which is sub-divided to not over about 20 micron particle size, a liquid which is a non-solvent for said ceramic material, and a partially volatile resinous binder which provides carbon residue on heating.

2. As a new article of manufacture, an emulsion adapted for use in making graphite and the like refractory articles containing residual carbon bond, comprising a stable emulsion of refractory ceramic material which does not swell in water and when dry is of slippery, unctuous nature at least the major proportion of which is sub-divided to not over about 14 micron particle size, a liquid which is a non-solvent for said ceramic material, and a partially volatile resinous binder which provides carbon residue on heating.

3. As a new article of manufacture, an emulsion adapted for use in making graphite and the like refractory articles containing residual carbon bond, comprising stable emulsion of ceramic material of slippery, unctuous nature, a partially volatile resinous solid binder which provides carbon residue on heating, said ceramic material and binder being sub-divided to not over about 20 micron particle size, and a liquid which is a non-solvent for said ceramic material.

4. As a new article of manufacture, an emulsion adapted for use in making graphite and the like refractory articles containing residual carbon bond, comprising stable emulsion of pyrophyllite and solid resinous binder which provides carbon residue on heating, both sub-divided to not over about 14 micron particle size, and solution of a partially volatile resinous binder which provides temporary bond.

5. As a new article of manufacture, an emulsion adapted for use in making graphite and the like refractory articles containing residual carbon bond, comprising stable emulsion of ceramic material of slippery, unctuous nature the major proportion of which is sub-divided to not over about 20 micron particle size, and an aqueous solution of a partially volatile resinous binder which provides carbon residue on heating.

6. As a new article of manufacture, an emulsion adapted for use in making graphite and the like refractory articles containing residual carbon bond, comprising stable emulsion of refractory ceramic material which does not swell in water and when dry is of slippery, unctuous nature, pitch of high fixed carbon content, both sub-divided to not over about 14 micron particle size, and solution of a partially volatile resinous binder which provides temporary bond.

7. As a new article of manufacture, a batch for making refractory articles containing graphite and residual carbon bond, the batch comprising graphite and an emulsion of ceramic material of slippery, unctuous nature sub-divided to not over about 20 micron particle size, a liquid which is a non-solvent for said ceramic material, and a partially volatile resinous binder which provides carbon residue on heating.

8. As a new article of manufacture, a batch for making refractory articles containing graphite and residual carbon bond, the batch comprising graphite and an emulsion of pyrophyllite sub-divided to not over about 14 micron particle size, a liquid which is a non-solvent for said ceramic material, and a partially volatile resinous binder which provides carbon residue on heating.

9. As a new article of manufacture, a batch for making refractory articles containing graphite and residual carbon bond, the batch comprising graphite and an emulsion of ceramic material of slippery, unctuous nature, solid partially volatile resinous binder which provides carbon residue on heating, both sub-divided to not over about 14 micron particle size, and a liquid which is a non-solvent for said ceramic material.

10. As a new article of manufacture, a batch for making refractory articles containing graphite and residual carbon bond, the batch comprising graphite and an emulsion of refractory ceramic material which does not swell in water and when dry is of slippery, unctuous nature sub-divided to not over about 20 micron particle size, and solution of a partially volatile resinous binder which provides carbon residue on heating.

11. As a new article of manufacture, a batch for making refractory articles containing graphite and residual carbon bond, the batch comprising graphite and an emulsion of ceramic material of slippery, unctuous nature, solid partially volatile resinous binder which provides carbon residue on heating, both sub-divided to not over about 20 micron particle size, and solution of a partially volatile resinous binder which provides temporary bond.

12. That method of making refractory graphite articles containing residual carbon bond which comprises preparing a refractory batch containing graphite, adding thereto from about 5 to about 50 per cent of an emulsion of refractory ceramic material which does not swell in water and when dry is of slippery, unctuous nature at least the major proportion of which is sub-divided to not over about 20 micron particle size, a liquid which is a non-solvent for said ceramic material, and a partially volatile resinous binder which provides carbon residue on heating, and shaping and firing the article.

13. That method of making refractory graphite articles containing residual carbon bond which comprises preparing a refractory batch containing graphite, adding thereto from about 5 to about 50 per cent of an emulsion of refractory ceramic material which does not swell in water and when dry is of slippery, unctuous nature sub-divided to not over about 14 micron particle size, a liquid which is a non-solvent for said ceramic material, and a partially volatile resinous binder which provides carbon residue on heating, and shaping and firing the article.

14. That method of making refractory graphite articles containing residual carbon bond which comprises preparing a refractory batch containing graphite, adding thereto from about 5 to about 50 per cent of an emulsion of ceramic material of slippery, unctuous nature, solid partially volatile resinous binder which provides carbon residue on heating, both sub-divided to not over about 20 micron particle size, and a liquid which is a non-solvent for said ceramic material.

15. That method of making refractory graphite articles containing residual carbon bond which comprises preparing a refractory batch containing graphite, adding thereto from about 5 to about 50 per cent of an emulsion of refractory ceramic material which does not swell in water and when dry is of slippery, unctuous nature sub-divided to not over about 14 micron particle size, and solution of a partially volatile resinous binder which provides carbon residue on heating.

16. That method of making refractory graphite articles containing residual carbon bond which comprises preparing a refractory batch containing graphite, adding thereto from about 5 to about 50 per cent of an emulsion of pyrophyllite, solid partially volatile resinous binder which provides carbon residue on heating, both sub-divided to not over about 14 micron particle size, and solution of a partially volatile resinous binder which provides temporary bond.

17. That method of making refractory graphite articles containing residual carbon bond which comprises preparing a refractory batch containing graphite, adding thereto from about 5 to about 50 per cent of an emulsion of refractory ceramic material which does not swell in water and when dry is of slipper, unctuous nature, pitch of high fixed carbon content, both sub-divided to not over about 20 micron particle size, and a liquid which is a non-solvent for said ceramic material.

HAROLD E. WHITE.